(12) United States Patent
Hurst et al.

(10) Patent No.: US 8,356,520 B2
(45) Date of Patent: Jan. 22, 2013

(54) HOUSING FOR A DRIVE DEVICE, DRIVE DEVICE AND METHOD FOR TESTING THE TIGHTNESS OF A PRESSURE COMPENSATING MEMBRANE

(75) Inventors: Richard Hurst, Offenburg (DE); Guenter Kastinger, Gaggenau-Sulzbach (DE); Thomas Holzer, Shanghai (CN); Alexander Dudek, Offenburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/991,514

(22) PCT Filed: Mar. 10, 2009

(86) PCT No.: PCT/EP2009/052776
§ 371 (c)(1), (2), (4) Date: Feb. 10, 2011

(87) PCT Pub. No.: WO2009/135716
PCT Pub. Date: Nov. 12, 2009

(65) Prior Publication Data
US 2011/0167917 A1 Jul. 14, 2011

(30) Foreign Application Priority Data
May 6, 2008 (DE) .......................... 10 2008 001 591

(51) Int. Cl.
*G01L 19/04* (2006.01)
(52) U.S. Cl. .......................................................... 73/708
(58) Field of Classification Search ............. 73/700–756
See application file for complete search history.

(56) References Cited

U.S. PATENT DOCUMENTS

| | | | | |
|---|---|---|---|---|
| 5,215,312 A | * | 6/1993 | Knappe et al. | 277/312 |
| 5,455,804 A | * | 10/1995 | Holmes et al. | 367/83 |
| 5,520,257 A | * | 5/1996 | Crews | 175/227 |
| 2009/0179032 A1 | * | 7/2009 | Livingston | 220/254.7 |

FOREIGN PATENT DOCUMENTS

| | | |
|---|---|---|
| DE | 9000324 | 5/1991 |
| DE | 10307861 | 9/2004 |
| DE | 202006008917 | 8/2006 |
| DE | 102007012703 | 6/2008 |
| DE | 102007022192 | 11/2008 |
| EP | 1266741 | 12/2002 |
| EP | 1313359 | 5/2003 |
| EP | 1884695 | 2/2008 |
| EP | 1921020 | 5/2008 |
| WO | 8809422 | 12/1988 |

OTHER PUBLICATIONS

International Search Report, PCT/EP2009/052776, Nov. 10, 2009, 3 pages.

* cited by examiner

*Primary Examiner* — Andre Allen
(74) *Attorney, Agent, or Firm* — Michael Best & Friedrich LLP

(57) ABSTRACT

The invention relates to a housing (2) for a drive device, especially for an adjusting device and/or a windshield wiper drive in a motor vehicle, comprising a pressure compensating membrane (4) obturating a housing opening (7). The invention is characterized in that the pressure compensating membrane (4) has a peripheral sealing surface (11) which extends continuously in the direction of circumference. The invention further relates to a drive device and to a method for testing the operativeness of a pressure compensating membrane (4).

15 Claims, 2 Drawing Sheets

HOUSING FOR A DRIVE DEVICE, DRIVE DEVICE AND METHOD FOR TESTING THE TIGHTNESS OF A PRESSURE COMPENSATING MEMBRANE

BACKGROUND OF THE INVENTION

The invention relates to a housing for a drive device, in particular for an adjusting drive in a motor vehicle, to a drive device, in particular an adjusting drive and/or a windshield wiper drive in a motor vehicle, preferably a window adjusting drive, and to a method for testing the leak tightness of a pressure compensating diaphragm.

Pressure compensating diaphragms have the task of enabling pressure compensation between a housing interior volume and the environment in order thereby to avoid critical excess pressures and/or negative pressures on account of temperature fluctuations. Furthermore, pressure compensating diaphragms have the function of preventing an infiltration of liquid into the housing interior. Pressure compensating diaphragms are used on housings for drive devices, in particular in the automotive field, wherein the pressure compensating diaphragms may be fixed by welding either directly to a support formed by a housing wall or to a support which is fixed to the housing. In known housings, the housing geometry surrounding the pressure compensating diaphragm has areas of unevenness and jagged areas, such that testing of the functional capability of the pressure compensating diaphragm must be carried out before the latter is mounted on the housing. It is a disadvantage here that it is not possible to test the leak tightness of the connection between the pressure compensating diaphragm and the housing, or between a support, which bears the pressure compensating diaphragm, and the housing.

SUMMARY OF THE INVENTION

The invention is therefore based on the problem of proposing a housing having a pressure compensating diaphragm which permits leak tightness testing of the pressure compensating diaphragm on the housing. A further problem is that of proposing a correspondingly optimized drive device and a correspondingly optimized method for testing the leak tightness of a pressure compensating diaphragm.

Said problem is solved, with regard to the housing, by means of the features of the claims. Advantageous refinements of the invention are specified in the subclaims. The scope of the invention encompasses all combinations of at least two of the features disclosed in the description, the claims and/or the figures. To avoid repetitions, features disclosed in device terms should also be regarded as being disclosed, and claimable, in method terms. Likewise, features disclosed in method terms should also be regarded as being disclosed, and claimable, in device terms.

The invention is based on the concept of providing on the housing a sealing surface which runs around the pressure compensating diaphragm and which has a profile which is continuous, that is to say has no steps, in the circumferential direction. The pressure compensating diaphragm itself is in turn preferably surrounded by areas of unevenness and jagged areas which, in the prior art, extend directly up to the pressure compensating diaphragm, wherein the pressure compensating diaphragm is distinguished from said areas of unevenness and jagged areas by its encircling, continuous profile. As a result of the provision of a sealing surface which is fixed, in particular welded, either directly to the housing or to a support mounted on the housing and which runs around the pressure compensating diaphragm and runs continuously in the circumferential direction, it is for the first time made possible for the functional capability of the pressure compensating diaphragm and also the leak tightness of the connection between pressure compensating diaphragm and housing, or between support and housing, to be tested directly on the housing by virtue of a suitable testing device being placed in sealing contact against the encircling sealing surface and the pressure compensating diaphragm being acted on from the outside with compressed air or a liquid such as water, for example. Here, the functional capability or defectiveness of the pressure compensating diaphragm and of the weld seam can be tested on the basis of the volume flow to be measured or the applied pressure. On the basis of the measured volume flow or the built-up pressure, it is possible in particular to determine whether the pressure compensating diaphragm is impermeable to liquid, in particular to water. With a housing designed according to the concept of the invention, with an encircling sealing surface, it is advantageously possible to dispense with a test of the pressure compensating diaphragm for leak tightness before it is mounted.

An embodiment is particularly advantageous in which the sealing surface has no upward slopes and downward slopes in the circumferential direction, but rather is arranged in a sealing plane. This facilitates the leak tightness testing and the contact of the testing device against the sealing surface, because it is not necessary for the testing device to be exactly centered with respect to the sealing surface.

Particularly advantageous is an embodiment of the housing in which the sealing surface is formed by an end side, which faces away from the housing interior, on a circumferential wall which runs around the pressure compensating diaphragm preferably with a spacing. Said circumferential wall is preferably offset at least in sections relative to the surrounding housing surface geometry, and in particular is formed so as to be elevated relative thereto. The radial extent of the sealing surface and/or circumferential wall is preferably selected from a range between approximately 2 mm and 10 mm. The radial extent is preferably approximately 5 mm.

To avoid a build-up of liquid in a region radially within the sealing surface, which could lead to the "breathing function" of the pressure compensating diaphragm being impaired, it is advantageously provided in one refinement of the invention that the sealing surface arranged to the side of the pressure compensating diaphragm is offset, that is to say arranged below the radially outer edge region of the pressure compensating diaphragm. Here, the pressure compensating diaphragm, which is in particular of circular, oval, elongate or rectangular contour, is preferably arranged not so as to be planar but rather so as to be convex in order to effect an optimized run-off of liquid from the diaphragm.

In one refinement of the invention, it is advantageously provided that, to protect the pressure compensating diaphragm, a protective cover is arranged above the latter, with the sealing surface arranged to the side of the protective cover preferably being arranged in a region below the protective cover as viewed in the vertical direction, in order hereby to prevent a build-up of liquid, which impairs the functional capability of the pressure compensating diaphragm, in a region within the sealing surface during operation of the housing.

To obtain a housing which is extremely stable using a minimal amount of material, it is advantageously provided in one refinement of the invention that the housing has at least one reinforcement rib on its outer side. Here, in the prior art, the pressure compensating diaphragm is often surrounded by reinforcement ribs which are designed so as to delimit a type of pan within which the pressure compensating diaphragm is arranged, specifically below the top edge of the reinforcement ribs, which has the effect that liquid can collect in the pan formed by the reinforcement ribs and impair the function of the pressure compensating diaphragm by flooding the latter. In particular in the event of complete flooding of the pressure compensating diaphragm, a breathing function, that is to say an air exchange function, is no longer provided. It is now provided as one refinement, and as an independent invention, that the at least one reinforcement rib is modified or shaped such that at least one water run-off facility is formed which reliably prevents a critical build-up of liquid in a region between the reinforcement rib and the pressure compensating diaphragm. Here, the at least one reinforcement rib has a depression which is situated to the side of and below the pressure compensating diaphragm, the barrier formed by the reinforcement rib is broken up.

An embodiment is particularly advantageous in which the at least one reinforcement rib, preferably at least two reinforcement ribs, has/have in each case a height extent which varies over its/their longitudinal extent, and/or is/are provided with an aperture. Here, at least one lowest point should be provided which is arranged at the level of the edge region of the pressure compensating diaphragm or preferably below said edge region.

One option for realizing a varying height extent consists in that at least one reinforcement rib has, at least in one section, a wedge shape as viewed in the direction of its longitudinal extent. An embodiment is particularly preferable in which the reinforcement rib comprises two wedge sections facing toward one another.

The invention also specifies a drive device, in particular a motor vehicle. Said drive device is particularly preferably a windshield wiper drive having a gearing arranged in the housing. The drive device is characterized by a housing as described above, with an encircling sealing surface which has a continuous profile and/or with at least one reinforcement rib which enables a run-off of liquid.

The invention furthermore specifies a method for testing the functional capability (air permeability and/or liquid leak tightness) of a pressure compensating diaphragm with the aid of a testing device. According to the invention, it is provided that the functional capability testing is carried out when the pressure compensating diaphragm is arranged on the housing, wherein for the functional capability testing, the testing device is placed in sealing contact, in particular by means of an elastic sealing region, against the sealing surface which runs around the pressure compensating diaphragm. The functional capability testing takes place preferably by subjecting the pressure compensating diaphragm to the action of a gas, in particular compressed air. By virtue of the functional capability testing being carried out when the pressure compensating diaphragm is mounted on the housing, it is possible to test not only the leak tightness of the gas-permeable pressure compensating diaphragm itself with regard to liquid, but rather also the liquid leak tightness of the connection between the pressure compensating diaphragm and housing, or between the support and housing and/or between the pressure compensating diaphragm and support, and also of the weld seam.

BRIEF DESCRIPTION OF THE DRAWINGS

Further advantages, features and details of the invention will emerge from the following description of preferred exemplary embodiments and on the basis of the drawings, in which.

DETAILED DESCRIPTION

Figure 1:
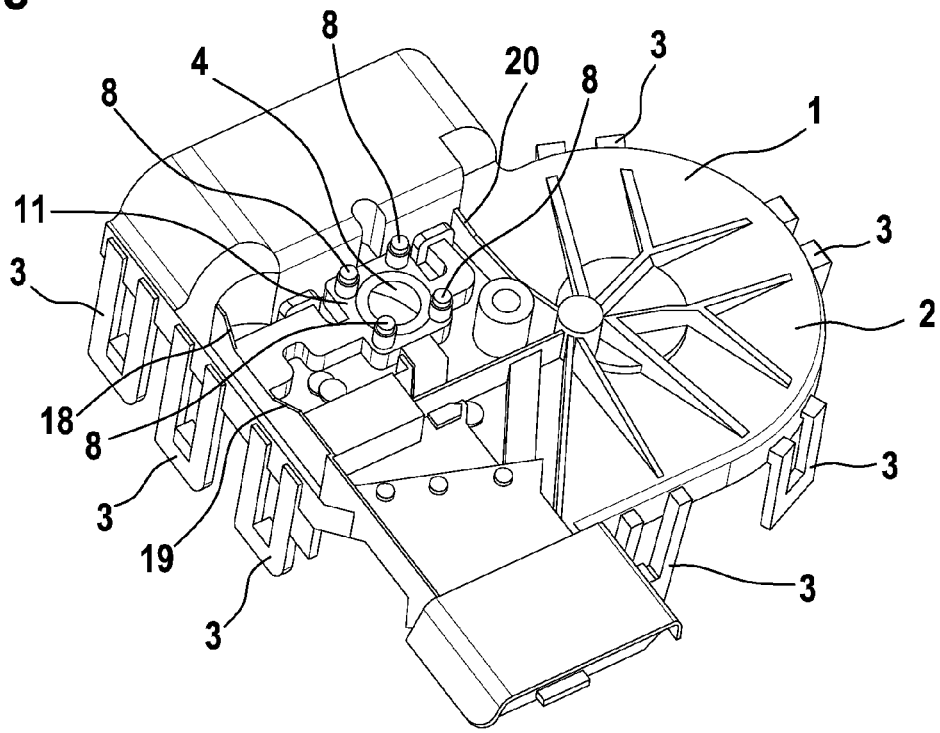
FIG. 1 shows a housing cover of a housing of a drive device having a pressure compensating diaphragm which runs around a planar sealing surface.

In the figures, identical components and components with the same function are denoted by the same reference numerals.

Figure 2:
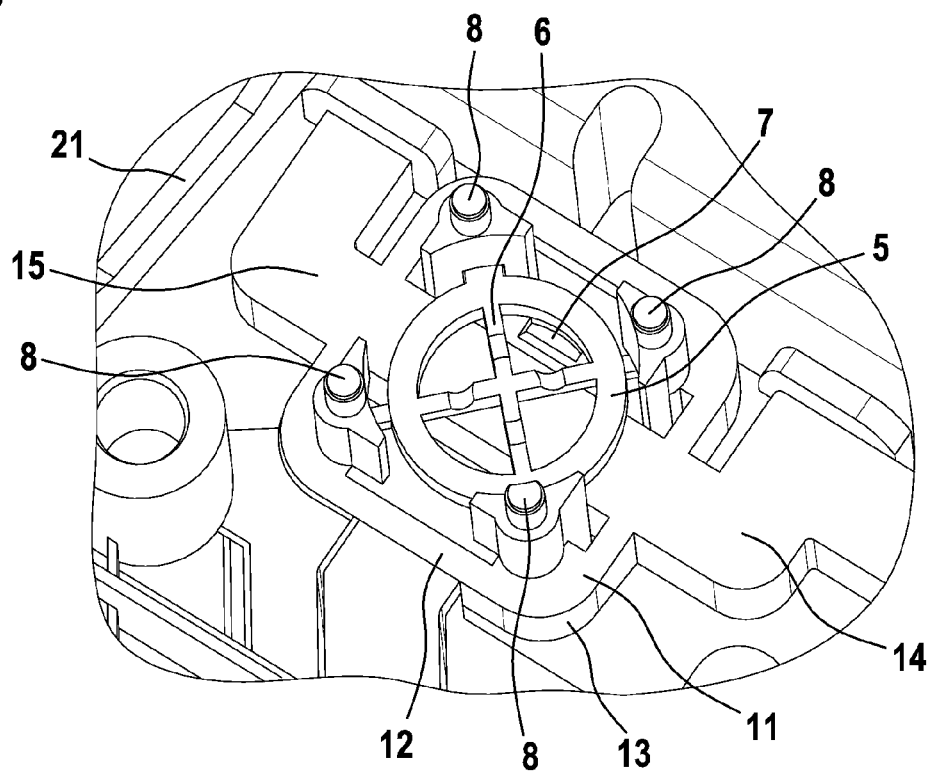
FIG. 2 shows an enlarged section from FIG. 1, wherein an illustration of the pressure compensating diaphragm has been dispensed with for reasons of clarity.

FIG. 1 shows a housing cover 1 of a housing 2 for a drive device in a motor vehicle. The housing cover 1 can be fixed by means of lateral latching lugs 3 to a housing basic body (not shown). Held in the housing, which is formed from polybutylene terephthalate (PBT), is a gearing (not shown) which can be driven by an electric motor (not shown). Fixedly welded to the housing cover 1 of the housing 2 is a pressure compensating diaphragm 4 composed of woven polytetrafluoroethylene (PTFE), which compensating diaphragm 4 is of circular contour in the exemplary embodiment shown. For this purpose, as can be seen in FIG. 2, a bearing ring 5 is provided, on which the pressure compensating diaphragm can be laid and to which the pressure compensating diaphragm can be welded by means of its circumferential edge. Webs 6 arranged in the shape of a cross extend radially inward from the bearing ring 5, which webs 6 support the pressure compensating diaphragm 4 radially within the bearing ring 5. In the mounted state, the pressure compensating diaphragm 4 closes off a housing opening 7 which enables an exchange of air between the housing interior and the environment in order thereby to be able to prevent temperature-fluctuation-induced excess pressures and/or negative pressures critical to the stability of the housing 2. For this purpose, the pressure compensating diaphragm 4 is of air-permeable and water-repellent design.

Figure 3:
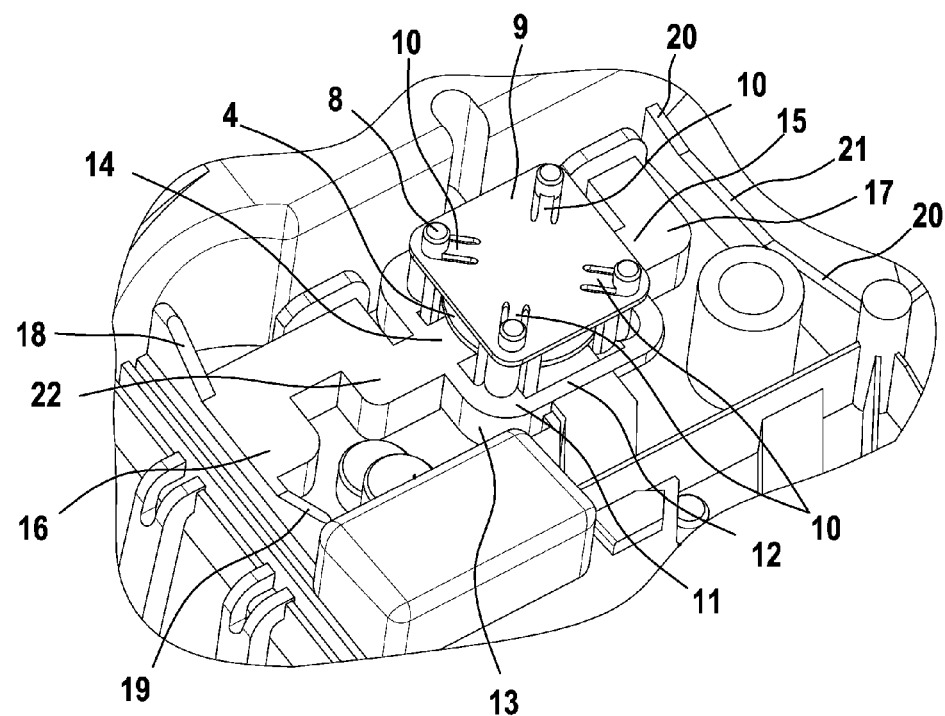
FIG. 3 shows a detail of a housing surface with a pressure compensating diaphragm protected by a protective cover.

As can also be seen from FIG. 2, post-like elevations 8 which delimit the corners of a rectangle are situated radially outside the support ring 5 and therefore radially outside the mounted pressure compensating diaphragm 4. Said elevations 8 serve to support a protective cover 9 which is shown in FIG. 3 and which can be arranged above the pressure compensating diaphragm 4, which protective cover 9 can be latched by means of latching arms 10 to the axial ends of the post-like elevations 8. The protective cover 9 prevents damage to the pressure compensating diaphragm 4 in the motor vehicle and during the mounting of the housing 2 in the motor vehicle.

As emerges in particular from FIGS. 2 and 3, a planar sealing surface 11 is provided at a radial distance from the pressure compensating diaphragm 4 and radially at the outside adjacent to the post-like elevations 8, which sealing surface 11 has a continuous profile in the circumferential direction on account of the planar arrangement. In the exemplary embodiment shown, the sealing surface 11 lies in an imaginary plane. The sealing surface 11 is formed by an end side 12 of a circumferential wall 13 which is offset from a jagged surface structure radially outside the circumferential wall 13.

The sealing surface 11 which is arranged to the side of the bearing ring 5 lies, as viewed in the vertical direction, in a region below the bearing ring 5 and therefore below the edge region of the pressure compensating diaphragm 4, that is to say offset in the direction of the housing interior relative to the pressure compensating diaphragm 4. The circumferential wall 13 or the sealing surface 11 therefore does not form any liquid basin in which liquid could rise above a liquid level higher than the pressure compensating diaphragm 4.

As also emerges from FIGS. 2 and 3, the sealing surface 11 merges, at two sections 14, 15 offset relative to one another by 180°, into planar structure surfaces 16, 17 which extend away from the pressure compensating diaphragm 4 and which lie in a common imaginary plane with the sealing surface 11.

To test the pressure compensating diaphragm 4 and the connection between the bearing ring 5 and pressure compensating diaphragm 4 for leak tightness and functional capability, a testing device can be placed sealingly onto the sealing surface 11 from the outside, by means of which testing device the pressure compensating diaphragm 4 can be acted on with compressed air.

It emerges in particular from FIG. 3 that reinforcement ribs 18 to 20 are provided on the outside of the housing 2 at a radial distance from the pressure compensating diaphragm 4 and also at a radial distance from the sealing surface 11, wherein the reinforcement ribs 18 to 20 do not have a continuous planar profile. Instead, the height extent of the reinforcement ribs 18 to 20 varies with increasing longitudinal extent. Here, the reinforcement ribs 18, 19 are of wedge-shaped design, with the height extent of the reinforcement ribs 18, 19 decreasing from an edge region down to the structure surface 16. The continuous reinforcement rib 20 also has a height extent which decreases at both sides to a central section 21 which lies at the height level of the planar structure surfaces 16, 17. On account of the decreasing height extent of the reinforcement ribs 18 to 20, it is ensured that liquid in a section 22 within the reinforcement ribs 18 to 20 cannot rise to the height level of the pressure compensating diaphragm 4, but rather can rise only as far as the height level of the structure surfaces 16, 17 or of the sealing surface 11, wherein both the structure surfaces 16, 17 and also the sealing surface 11 lie below the height level of the pressure compensating diaphragm 4. In this way, the breathing capability of the pressure compensating diaphragm 4 during operation of the drive device can be permanently ensured.

Figure 4:
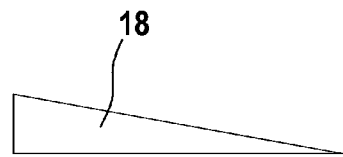
FIG. 4 shows an illustration of a possible reinforcement rib profile.

FIG. 4 shows, in a side view, the height profile of the reinforcement rib 18 illustrated at the left in FIG. 3. It is possible to see the wedge-shaped profile of the reinforcement rib 18, the height extent of which decreases down to the height level of the sealing surface 11.

Figure 5:
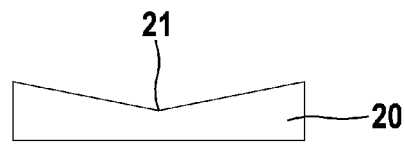
FIG. 5 shows an alternative reinforcement rib profile.

FIG. 5 schematically shows, in a side view, the height profile of the continuous reinforcement rib 20. It can be seen that the height of the reinforcement rib 20 from the edge sides thereof to a central section 21, wherein the height level of the section 21 lies below the edge region of the pressure compensating element 4. In the physical exemplary embodiment, the height level of the section 21 corresponds to the height level of the sealing surface 11.

The invention claimed is:

1. A housing for a drive device, the housing comprising a housing structure, and a pressure compensating diaphragm (4) which closes off a housing opening (7) in the housing structure, characterized in that the housing structure includes a sealing surface (11) which runs around the pressure compensating diaphragm (4), the sealing surface being formed by the upper end (12) of a circumferential wall (13) of the housing structure, wherein the wall runs around the diaphragm at a radial distance from the diaphragm, the upper end of the wall being offset from jagged surface structure radially outside of the wall and the sealing surface having a profile which is continuous in the circumferential direction.

2. The housing as claimed in claim 1, characterized in that the sealing surface (11) is arranged in a sealing plane.

3. The housing as claimed in claim 1, characterized in that the sealing surface (11), viewed along a longitudinal central axis of the housing opening (7), is arranged below an outer edge region of the pressure compensating diaphragm (4).

4. The housing as claimed in claim 1, characterized in that the sealing surface (11), as viewed radially outside and along a longitudinal central axis of the housing opening (7), is below a protective cover (9) above the pressure compensating diaphragm (4), the cover being fixed to the housing structure.

5. The housing as claimed in claim 1, characterized in that the housing (2) has at least one reinforcement rib (18, 19, 20) situated at the outside of the housing structure.

6. The housing as claimed in claim 5, characterized in that the reinforcement rib (18, 19, 20) has a section of reduced height so as to ensure a run-off of liquid situated between the pressure compensating diaphragm (4) and the reinforcement rib (18, 19, 20).

7. The housing as claimed in claim 6, characterized in that the reinforcement rib (18, 19, 20) has a height extent which varies over its longitudinal extent.

8. The housing as claimed in claim 7, characterized in that the reinforcement rib (18, 19, 20) has a wedge shape at least in sections.

9. The housing as claimed in claim 6, characterized in that the reinforcement rib (18, 19, 20) has an aperture.

10. The housing as claimed in claim 9, characterized in that the reinforcement rib (18, 19, 20) has a wedge shape at least in sections.

11. The housing as claimed in claim 5, characterized in that the reinforcement rib (18, 19, 20) has a wedge shape at least in sections.

12. The housing as claimed in claim 5, characterized in that the reinforcement rib (18, 19, 20) has an aperture.

13. The housing as claimed in claim 1, characterized in that the sealing surface (11) is arranged in a sealing plane which runs perpendicular to the longitudinal central axis of the housing opening (7).

14. A drive device, the drive device comprising a gearing held in a housing (2), the housing including a housing structure, and a pressure compensating diaphragm (4) which closes off a housing opening (7) in the housing structure, characterized in that the housing structure includes a sealing surface (11) which runs around the pressure compensating diaphragm (4), the sealing surface being formed by the upper end (12) of a circumferential wall (13) of the housing structure, wherein the wall runs around the diaphragm at a radial distance from the diaphragm, the upper end of the wall being offset from a jagged surface structure radially outside of the wall, and the sealing surface having a profile which is continuous in the circumferential direction.

15. A method for testing the functional capability of a pressure compensating diaphragm (4) using a testing device, the method comprising
providing a housing structure, and a pressure compensating diaphragm (4) which closes off a housing opening (7) in the housing structure, wherein the housing structure includes a sealing surface (11) which runs around the pressure compensating diaphragm (4), the sealing surface being formed by the upper end (12) of a circumferential wall (13) of the housing structure, wherein the wall runs around the diaphragm at a radial distance from the diaphragm, the upper end of the wall being offset from a jagged surface structure radially outside of the wall, and the sealing surface having a profile which is continuous in the circumferential direction, and
performing the functional capability test by placing the testing device in sealing contact against the sealing surface.

* * * * *

UNITED STATES PATENT AND TRADEMARK OFFICE
CERTIFICATE OF CORRECTION

PATENT NO. : 8,356,520 B2  
APPLICATION NO. : 12/991514  
DATED : January 22, 2013  
INVENTOR(S) : Hurst et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 26 days.

Signed and Sealed this
First Day of September, 2015

Michelle K. Lee
*Director of the United States Patent and Trademark Office*